July 17, 1962 D. W. BREDE 3,045,072

RECORDING AND/OR REPRODUCING APPARATUS AND HEAD CARRIAGE THEREFOR

Filed Aug. 13, 1959 3 Sheets-Sheet 1

DWIGHT W. BREDE
INVENTOR

BY Flehr & Swain
ATTORNEYS

DWIGHT W. BREDE
INVENTOR.

BY Flehr and Swain
ATTORNEYS

July 17, 1962 D. W. BREDE 3,045,072

RECORDING AND/OR REPRODUCING APPARATUS AND HEAD CARRIAGE THEREFOR

Filed Aug. 13, 1959

3 Sheets-Sheet 3

DWIGHT W. BREDE
INVENTOR.

BY Flehr & Swain
ATTORNEYS

United States Patent Office 3,045,072

Patented July 17, 1962

3,045,072

RECORDING AND/OR REPRODUCING APPARATUS AND HEAD CARRIAGE THEREFOR

Dwight W. Brede, Mountain View, Calif., assignor to Ampex Corporation, Redwood City, Calif., a corporation of California Filed Aug. 13, 1959, Ser. No. 833,464
6 Claims. (Cl. 179—100.2)

This invention relates generally to a recording and/or reproducing apparatus and head carriage therefor and more particularly to a magnetic tape recording and reproducing apparatus employing a magnetic tape.

Generally, in magnetic tape apparatus, relative movement between the magnetic recording tape and transducing head is achieved by moving the tape past the heads. Intimate head to tape contact is desirable where high frequency response and minimum sensitivity to tape drop-out is required. To minimize tape and head wear, it is desirable to be able to move the heads away from the tape when the tape is moved in the fast forward or in rewind mode of operation. Movement of the heads away from the tape also reduces accumulation of oxide on the heads.

In magnetic tape apparatus of the multi-channel type, it is important to maintain accurate positioning of the heads. Any error in positioning of the head across the tape will cause a loss of signal. In digital recording where the bits making up a character or number are recorder in parallel fashion, skew of the magnetic heads will give rise to erroneous output readings. Skew of the magnetic head will also introduce a phase error. Because of the errors which might be introduced due to inaccurate positioning of the magnetic heads, prior art apparatus, in general, has employed magnetic heads which continuously engage the tape.

It is a general object of the present invention to provide a recording and/or reproducing apparatus in which the heads are movable into and out of engagement with the magnetic tape.

It is another object of the present invention to provide a novel head carriage for accurately moving and positioning transducr heads employed in a magnetic tape apparatus.

It is still a further object of the present invention to provide a head carriage which has a single degree of freedom and has five degrees of adjustment.

It is a further object of the present invention to provide a head carriage in which the power requirements are minimized and which moves rectilinearly to accurately register the magnetic heads with an associated tape.

These and other objects of the invention will become more clearly apparent from the following description when taken in conjunction with the accompanying drawing.

Referring to the drawing.

Figure 1:
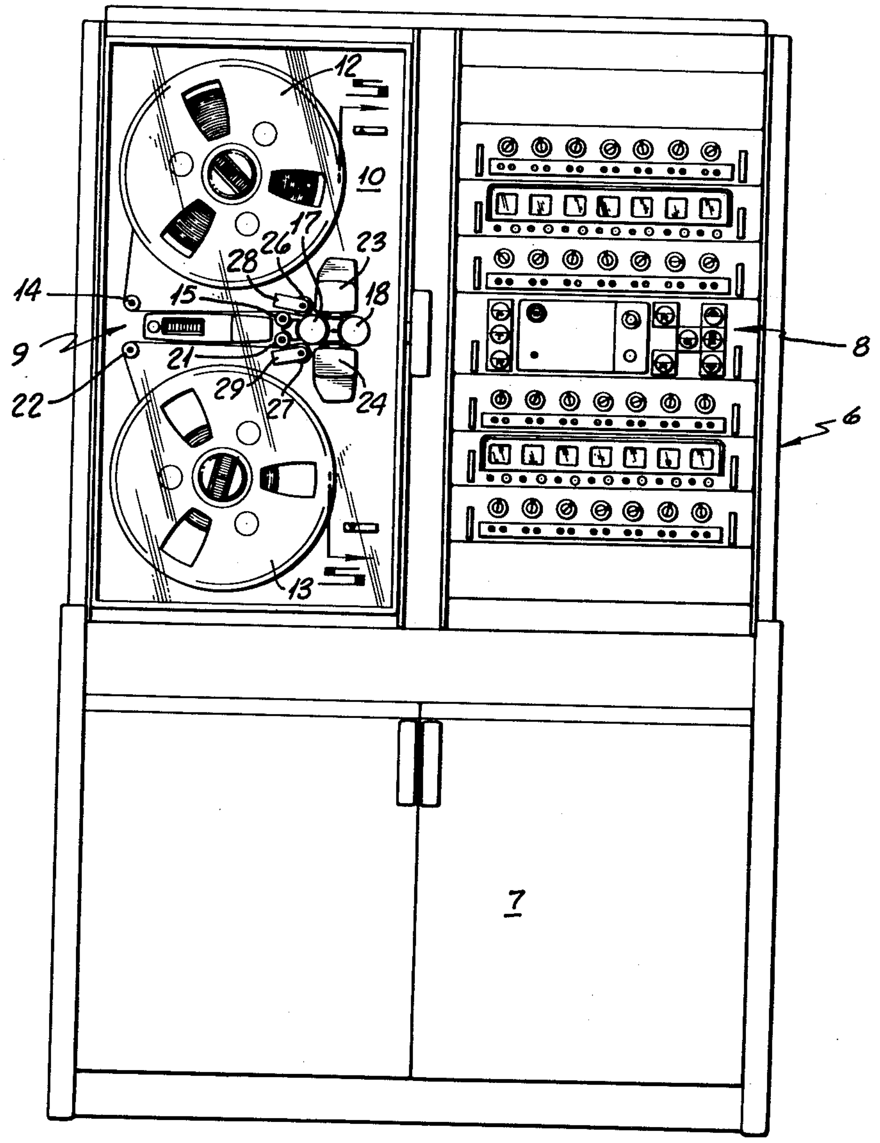
FIGURE 1 is an elevational view of a magnetic tape apparatus incorporating the present invention.

The magnetic tape apparatus illustrated in FIGURE 1 includes a housing 6 having a lower cabinet 7. Mounted over the cabinet are the control electronics 8 and a tape transport 9 of the closed loop type. The tape transport includes a framework 11 (FIGURE 2) which carries the supply and take-up reels 12 and 13. A plate 10 is carried on the framework to improve the appearance. Suitable drive means (not shown) are provided for each of the turntables. For example, the drive means may include a motor associated with each of the turntables and suitable braking means to decelerate and stop motion of the turntables.

As is well known, in magnetic recording apparatus it is desirable to maintain tape tension during recording and reproduction. In conventional machines, suitable tension may be obtained by energizing the motor associated with the reel supplying the tape in a reverse direction or by applying a braking action to the turntables, or both.

On leaving the supply reel, the tape passes over guide post 14 and idler 15, over the capstan 17, around a turn-around idler 18, back over the capstan 17, past the idler 21 and guide post 22 and is wound onto the take-up reel 13.

Magnetic heads are carried within the housings 23 and 24 and engage the portion of the tape disposed between the capstan 17 and turn-around idler 18. Pinch rollers 26 and 27 are carried by the movable pinch roller arms 28 and 29, respectively. Suitable means (not shown) are carried beneath the frame for moving the arms to pinch the tape against the capstan for driving the tape past the magnetic heads at a constant velocity and for retracting the idlers for fast forward or rewind operation.

As described above, it is desirable in fast forward and in the rewind operation to move the heads away from the tape to minimize head and tape wear. Thus, the heads 31 and 32 (FIGURE 5) which are carried within the housings 23 and 24, respectively, are mounted on head mounts 33 and 34. The head mounts 33 and 34 are suitably secured to the head platforms 36 and 37. The adjacent surface of the head platforms 36 and 37 may include precision platforms 38 for accurately positioning the head mounts 33 and 34. Spaced bosses 39 are formed on the other side of the platforms 36 and 37. Pairs of resilient plates 41, 42 and 43, 44 are secured to the spaced bosses 39 of the platforms 36 and 37, respectively, as for example, by means of the screws 45. Guide members 46 and 47 are secured to the spaced plates 41, 42 and 43, 44, respectively.

Figures 2, 3, 4:
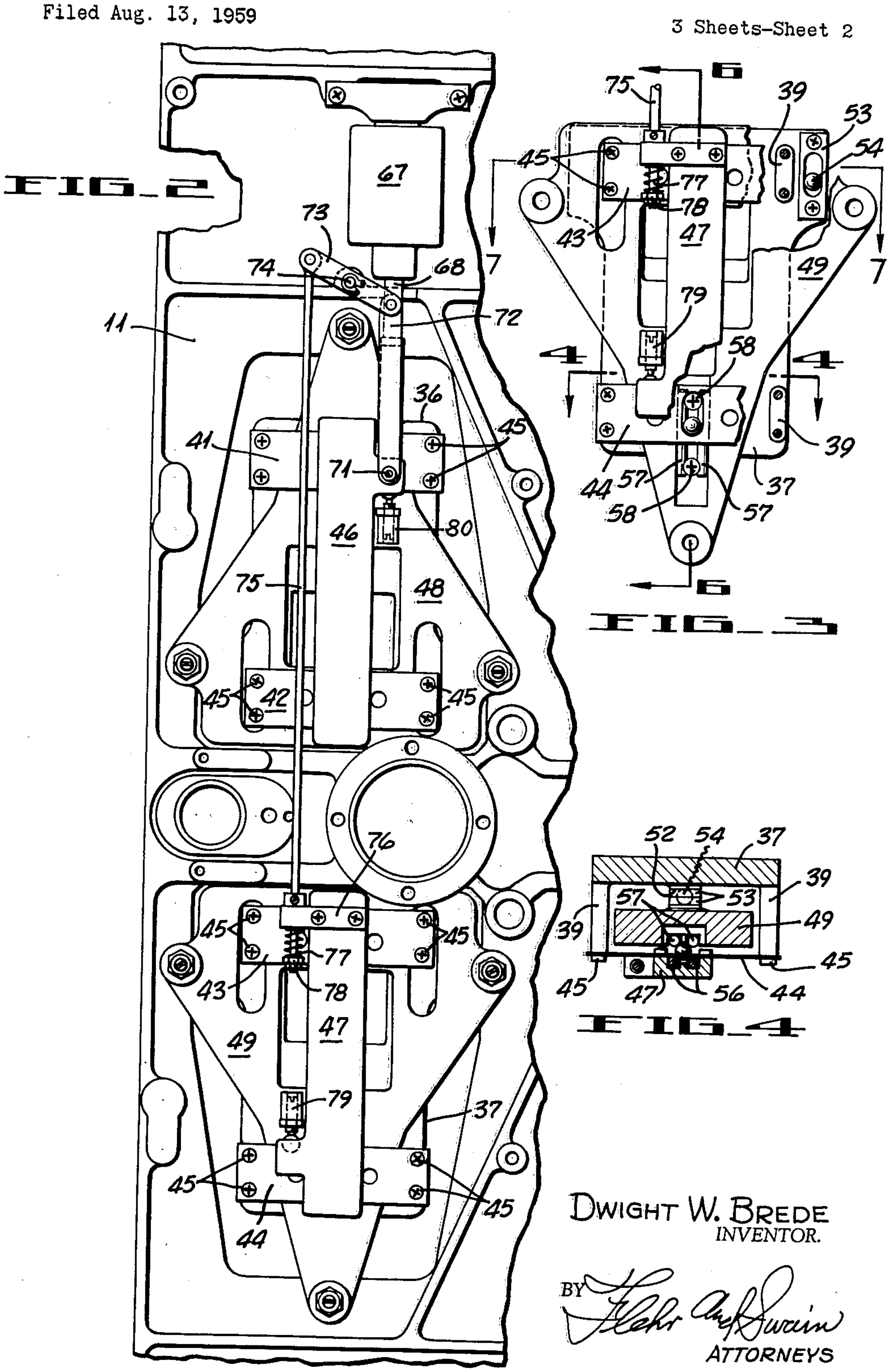
FIGURE 2 is a view taken beneath the top plate of the transport assembly showing the head carriage assembly in plan.
FIGURE 3 is a view of the lower portion of FIGURE 2 with certain parts broken away to illustrate the internal construction.
FIGURE 4 is a sectional view taken along the line 4—4 of FIGURE 3.
Figures 5, 6, 7, 8:
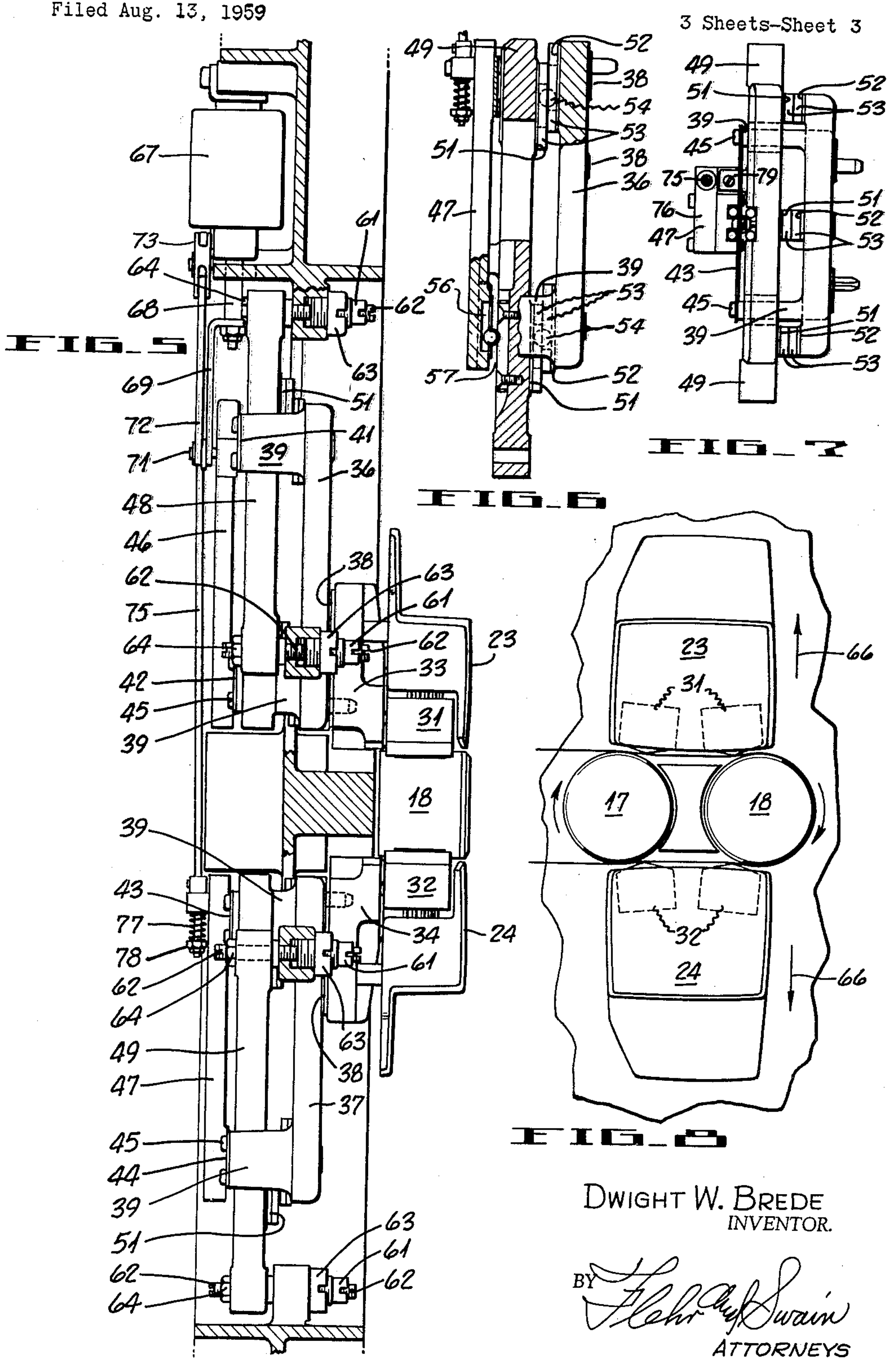
FIGURE 5 is a sectional view taken along the line 5—5 of FIGURE 1.
FIGURE 6 is a sectional view taken along the line 6—6 of FIGURE 3.
FIGURE 7 is a sectional view taken along the line 7—7 of FIGURE 3.
FIGURE 8 is an enlarged view showing the magnetic heads in engagement with the magnetic tape.

The head platforms 36 and 37 are carried by bases 48 and 49, respectively, FIGURES 2 and 5, which are secured to the frame 11, at three spaced points by adjustable securing means. As will be presently explained, the adjustable securing means provides means for accurately aligning the magnetic heads.

The base members 48 and 49 are provided with flat pads 51 (FIGURES 5, 6 and 7) at three spaced points. The head platforms 36 and 37 likewise carry flat pads 52 which are positioned to coincide within the limits of travel with the pads 51 formed on the base. Guide members 53, FIGURES 3, 6 and 7, are secured to the adjacent pads as, for example, by screws, to provide an accommodating recess for balls 54. The balls 54 serve to accurately space the adjacent pads and to minimize the friction between the pads while maintaining accurate alignment of each platform with its associated base.

Means are provided for assuring that the head platforms move rectilinearly to accurately align the heads with the tape when they are moved into engagement therewith. Referring to FIGURES 3 and 4, the means are clearly illustrated. Thus, the two ends of the guide members 46 and 47 are slotted to accommodate a pair of hardened dowels 56, FIGURES 3 and 4. The adjacent portion of the base 49 is slotted to accommodate spaced dowels 57. The dowels may be secured to the respective parts by means of spaced screws 58 which hold the same against the bottom. A steel ball is placed between the dowels to reduce friction and guide the parts. The action of the spaced dowels and balls assures rectilinear motion.

The flexible plates 41—44 provide a yieldable force between the parts which move with respect to one another and maintain the various parts in assembled relationship. Thus, it is seen that the apparatus is accurately guided in a rectilinear direction.

As previously described, the base members 48 and 49 are adjustably secured ot the frame 11 at three spaced points. Referring to FIGURE 5, the securing means, all of which are alike, are illustrated. The means comprises an adjustable sleeve 61 which threadably receives an adjustable screw 62. Lock nuts 63 and 64 are provided. The threads on the adjustable screw and adjustable sleeve are selected to have a different pitch and, therefore, a rotation of one of the parts wtih respect to the other will cause a movement per turn which is equal to the difference in pitch rather than to the pitch. The base members can be accurately adjusted by turning movement of the sleeve and screw. By supporting the base member at three spaced points, it is possible to accurately position (five degrees of adjustment) the supporting structure so that the heads accurtaely engage the tape.

The heads are moved simultaneously towards and away from the tape as indicated by the arrows 66, FIGURE 8. Movement is imparted by means of a piston (not shown) carried in air cylinder 67. The piston rod 68 engages the link 69 which is suitably secured to the pin 71 carried by the guide member 46. A second link 72 is also secured to the pin and its other end engages one end of the yoke 73, FIGURE 2, which is pivoted at 74. The other end of the yoke engages the link 75 which is suitably attached to the bracket 76 carried by the guide member 47. The link 75 extends through the bracket. A spring 77 is carried on the projecting part and held between the bracket 76 and nut 78. The spring 77 provides for a certain amount of movement of the link 75 after it has been seated so that the limits of travel of the heads may be independently adjustable. Adjustable stops 79 and 80 are provided for limiting the movement of the heads towards one another whereby the actual head to tape pressure may be controlled. The air cylinder is connected to a suitable pressure supply by a solenoid operated valve. Movement of the heads may be electrically controlled and tied into operation of the machine whereby the heads are automatically retracted during fast forward and rewind operation.

Thus, it is seen that there is provided a head carriage for supporting the magnetic heads and for accurately guiding the same between the retracted position to the operatting position. The head carriage includes means for aligning the heads and once adjusted, the heads move rectilinearly always engaging the tape with the same attitude.

I claim:

1. A head carriage comprising:

a base plate;

a pair of head carriage platse arranged in parallelism with and on either side of said base plate for conjoint reciprocal movement in a predetermined path lying in a plane parallel to the plane of said base plate, at least one of said carriage plates being adapted for mounting said head;

anti-friction bearing means mounted between said base plate and said carriage plates, said bearing means for at least one of said carriage plates being arranged to provide bearing action between said base plate and said one carriage plate at three triangularly spaced points lying in a plane parallel to the plane of said base palte, so as to maintain said plates in said parallelism throughout said reciprocal movement;

means coupling said carriage plates for said conjoint movement, said last-named means being arranged for clearing said base plate at all portions of said path of movement, and for urging said carriage plates toward one another and toward said base plate so as to maintain perpetual engagement between said plates and said bearing means; and guide means mounted between said plates for guiding said carriage plates in said predetermined path.

2. A head carriage comprising:

a base plate;

a pair of head carriage plates arranged in parallelism with an on either side of said base plate for conjoint reciprocal movement in a predetermined straight line path lying in a plane parallel to the plane of said base plate, at least one of said carriage plates being adapted for mounting said head;

anti-friction bearing means including a plurality of rolling members mounted between said base plate and said carriage plates, said rolling members for at least one of said carriage plates being three in number and positioned at three triangularly spaced points in a plane parallel to the plane of said base plate, so as to maintain said plates in said parallelism throughout said reciprocal movement;

means coupling said carriage plates for said conjoint movement, said last-named means being arranged for clearing said base plate at all portions of said path of movement, and for urging said carriage plates toward one another and toward said base plate so as to maintain perpetual engagement between said plates and said bearing means; and guide means mounted between said plates for guiding said carriage plates in said predetermined path.

3. A head carriage comprising:

a base plate;

a pair of head carriage plates arranged in parallelism with and on either side of said base plate for conjoint reciprocal movement in a predetermined straight line path lying in a plane parallel to the plane of said base plate, at least one of said carriage plates being adapted for mounting said head;

anti-friction bearing means including a plurality of rolling members mounted between said base plate and said carriage plates, said rolling members for at least one of said carriage plates being three in number and positioned at three triangularly spaced points in a plane parallel to the plane of said base plate, so as to maintain said plates in said parallelism throughout said reciprocal movement;

means coupling said carriage plates for said conjoint movement, said last-named means being arranged for clearing said base plate at all portions of said path of movement, and said last-named means also including resilient means for urging said carriage plates toward one another and toward said base plate so as to maintain perpetual engagement between said plates and said bearing means; and guide means mounted between said plates for guiding said carriage plates in said predetermined path.

4. A head carriage comprising:

a base plate;

a pair of head carriage plates arranged in parallelism with and on either side of said base plate for conjoint reciprocal movement in a predetermined straight line path lying in a plane parallel to the plane of said base plate, at least one of said carriage plates being adapted for mounting said head;

anti-friction bearing means including a plurality of ball members mounted between said base plate and said carriage plates, said ball members for at least one of said carriage plates being three in number and positioned at three triangularly spaced points in a plane parallel to the plane of said base plate, so as to maintain said plates in said parallelism throughout said reciprocal movement;

means coupling said carriage plates for said conjoint movement, said last-named means being arranged for clearing said base plate at all portions of said path of movement, and for urging said carriage plates toward one another and toward said base plate so as to maintain perpetual engagement between said plates and said bearing means; and guide means mounted on each of said plates and engaging said ball members for guiding said carriage plates in said predetermined path.

5. A head carriage as characterized in claim 4, wherein:

said guide means for at least one of said ball members includes four dowels aligned in parallel with one another and with said path, one pair of said dowels being mounted on said base plate and the other pair of said dowels being mounted on the respective carriage plate associated with said one ball member, said one ball member being positioned centrally of said dowels and engaging all of said dowels.

6. A head carriage assembly comprising:

a pair of head carriages arranged for supporting a pair of respective heads for reciprocal movement toward and away from one another along a predetermined straight line path, each of said carriages including:

a base plate mounted in a plane parallel to said path;

a pair of head carriage plates arranged in parallelism with and on either side of said base plate for conjoint reciprocal movement parallel to said predetermined straight line path, at least one of said carriage plates being adapted for mounting the respective one of said heads;

anti-friction bearing means including a plurality of ball members mounted between said base plate and said carriage plates, said ball members for at least one of said carriage plates being three in number and positioned at three triangularly spaced points in a plane parallel to the plane of said base plate, so as to maintain said plates in said parallelism throughout said reciprocal movement;

means coupling said carriage plates for said conjoint movement, said last-named means being arranged for clearing said base plate at all portions of said path of movement, and for urging said carraige plates toward one another and toward said base plate so as to maintain perpetual engagement between said plates and said bearing means;

guide means mounted on each of said plates and engaging said ball members for guiding said carriage plates in parallelism with said predetermined path; and means coupled to said pair of head carriages for causing said reciprocal movement thereof toward and away from one another.

References Cited in the file of this patent

UNITED STATES PATENTS

| | | |
|---|---|---|
| 2,551,845 | Lindsay | May 8, 1951 |
| 2,832,599 | Debrie | Apr. 29, 1958 |
| 2,962,558 | Hoshino | Nov. 29, 1960 |

FOREIGN PATENTS

| | | |
|---|---|---|
| 1,189,337 | France | Mar. 23, 1959 |